US006633053B1

(12) United States Patent
Jaeger (10) Patent No.: US 6,633,053 B1
(45) Date of Patent: Oct. 14, 2003

(54) METHOD AND APPARATUS FOR CREATING AT LEAST ONE QUBIT IN A QUANTUM COMPUTING DEVICE

(76) Inventor: Gregg Scott Jaeger, 70 Mt. Vernon St., Apartment 1-L, Cambridge, MA (US) 02140-2711

( * ) Notice: Subject to any disclaimer, the term of this patent is extended or adjusted under 35 U.S.C. 154(b) by 0 days.

(21) Appl. No.: 09/541,895

(22) Filed: Apr. 3, 2000

(51) Int. Cl.[7] ............................ H01L 31/02; G01J 4/00; G02F 1/03
(52) U.S. Cl. ...................... 257/14; 356/365; 359/246; 364/232.5; 364/249.4
(58) Field of Search ................... 356/365; 359/246; 364/232.5, 249.4; 257/14

(56) References Cited

U.S. PATENT DOCUMENTS

| | | | |
|---|---|---|---|
| 5,783,840 A | 7/1998 | Randall et al. | 257/24 |
| 5,793,091 A | 8/1998 | Devoe | 257/432 |
| 5,838,436 A | 11/1998 | Hotaling et al. | 356/345 |
| 5,917,322 A | 6/1999 | Gershenfeld et al. | 324/307 |
| 5,940,193 A | 8/1999 | Hotaling et al. | 359/11 |
| 6,718,020 | * 1/2001 | Schultz | 359/107 |

OTHER PUBLICATIONS

Boykin *Foundations of Computer Science* "On universal . . . Shor's Basis", Oct. 17–19, 1999.*
Dauler et al *Journ. of Res. NIST* 104, 1, 1999 "Tests of . . . Subfemtosecond Precision", Jan.–Feb. 1999.*
P.G. Kwait et al., "Grover's search algorithm: An Optical Approach", quart–ph/9905086, May 25, 1999, pp. 1–6.
N. J. Cerf et al., "Optical Simulation of Quantum Logic", quant–ph/9706022, Jun. 11, 1997, pp. 1–4.
C. Adami et al., "Quantum Computation With Linear Optics", quant–ph/9806048, Jun. 14, 1998.
David P. DiVincenzo, "The Physical Implementation of Quantum Computation", arXiv:quant–ph/0002077, Feb. 25, 2000, pp. 1–9.

* cited by examiner

*Primary Examiner*—Jerome Jackson (57) ABSTRACT

At least one qubit in a quantum computing device is created. At least one photon is placed into a superposition of quantum states. The quantum states each have an associated probability amplitude. The quantum states each are associated with a mode from a group of orthogonal modes. The probability amplitudes associated with the quantum states of the at least one photon are temporally separated thereby forming at least one qubit, the alternative values of which are thus temporally identifiable.

29 Claims, 5 Drawing Sheets

METHOD AND APPARATUS FOR CREATING AT LEAST ONE QUBIT IN A QUANTUM COMPUTING DEVICE

BACKGROUND OF THE INVENTION

The present invention relates generally to the multidisciplinary field of quantum computing which includes the fields of quantum physics and computer science. More specifically, the present invention relates to quantum computing for performing quantum computations.

Quantum computing, the use of quantum physical systems to represent and process information, has been a focus of research for approximately the last twenty years. An impetus for recent research has been the realization that computational problems exist that can be solved with qualitatively greater efficiency than by conventional digital computers. These computational problems include, for example, the Grover search algorithm and the Shor factorization algorithm.

A practical method for carrying out quantum computation, however, has proven elusive due to the quantum nature of the systems required. See, e.g., "The Physical Implementation of Quantum Computation," DiVincenzo, D. P., quant-ph/0002077, Feb. 25, 2000. Decoherence of quantum states can occur due to interactions of physical systems with the surrounding environment. This caused difficulty in carrying out quantum computation in practice. For example, decoherence of quantum states has prevented trapped ion devices from successfully implementing quantum computation. See, e.g., U.S. Pat. No. 5,793,091, entitled "Parallel Architecture for Quantum Computers using Ion Trap Arrays" which issued on Aug. 11, 1998.

Another impediment in achieving practical quantum computation relates to the difficulty in preparing the required initial quantum state for performing quantum computation. For example, this has prevented nuclear magnetic resonance (NMR) devices from successfully implementing quantum computation experimentally. See, e.g., U.S. Pat. No. 5,917,322, entitled "Method and Applications for Quantum Information Processing" which issued on Jun. 29, 1999.

One known alternative approach has been the use of quantum states in an optical device to implement quantum computation. By using weak coherent states, the necessary initial quantum state can be approximated and subsequently processed with negligible quantum decoherence. Consequently, previous impediments due to decoherence can be overcome.

These known optical-based systems, however, suffer from several shortcomings. For example, these known optical-based systems are semiclassical systems (consequently referred to as quantum computation "simulators") that fail to accomplish many of the expected benefits of an actual quantum computational system. See, e.g., "Optical Simulation of Quantum Logic", Cerf, N. J., et al., Physical Review A, Vol. 57, March 1998, PACS numbers: 03.65.Bz, 42.50.-p., 42.79.Ta,89.70+c; "Quantum Computation with Linear Optics", Adami, C. and Cerf N. J., quant-ph/9806048, Jun. 14, 1998; both of which are incorporated herein by reference for background purposes.

Moreover, these known optical-based systems fail to scale effectively; in other words, the physical size of these known systems increase more quickly than linearly with respect to the number of quantum bits (i.e., "qubits") of information to be processed. Said another way, as quantum computers having an ever greater number of qubits are considered, the number of system components physically required increases non-linearly, in some cases even exponentially. Consequently, constructing an actual quantum computer having a practical number of qubits has been physically prohibitive using known systems due to the physically unacceptable size and number of system components required.

SUMMARY OF THE INVENTION

At least one qubit in a quantum computing device is created. At least one photon is placed into a superposition of quantum states. The quantum states each have an associated probability amplitude. The quantum states each are associated with a mode from a group of orthogonal modes. The probability amplitudes associated with the quantum states of the at least one photon are temporally separated thereby forming at least one qubit, the alternative values of which are thus temporally identifiable.

DETAILED DESCRIPTION

In embodiments of the present invention, at least one qubit in a quantum computing device is created. At least one photon is placed into a superposition of quantum states. The quantum states each have an associated probability amplitude. The quantum states each are associated with a mode from a group of orthogonal modes. The probability amplitudes associated with the quantum states of the at least one photon are temporally separated thereby forming at least one qubit, the alternative values of which are thus temporally identifiable. The at least one qubit can be processed to perform any type of appropriate computation.

A qubit (i.e., a quantum bit) is a fundamental piece of information (i.e., a logical value of 0 or 1). A qubit is analogous to the classical "bit" of information, which can be represented, for example, by the mutually exclusive presence or absence of voltage or current measured by a meter. Quantum devices, on the other hand, are able to occupy simultaneously different quantum states (e.g., different quantum states associated with logical 0 or 1). This phenomenon is known as a "superposition" of quantum states.

Quantum states can be physically realized, for example, through a physical characteristic(s) of one or more photons. Photons are elementary quantum excitations of the electromagnetic field. The quantity (i.e., the number) of photons associated with the creation and logical manipulation of the least one qubit can be fixed. The physical characteristics of the at least one photon, referred to herein as "modes," can include, for example, the polarization of a photon(s) such as linear polarization or circular polarization. These modes can be from a set of "orthogonal modes" such as for example orthogonal polarizations. For example, the polarizations can include horizontal and vertical linear polarization, or clockwise and counterclockwise circular polarization.

Note that the orthogonal modes are orthogonal in the sense that the modes are separable. In other words, the specific modes need not be strictly orthogonal as long as the modes can be physically separable or recoverable. For example, for embodiments where the polarization associated with the quantum states are horizontal and vertical linear polarizations, the polarizations associated with the quantum states need not be strictly only horizontal linear polarization or strictly vertical linear polarization. Variations from linear polarizations are tolerable as long as the physical implementation of the quantum computing device can represent the proper quantum states through the polarizations.

Due to the probabilistic nature of quantum mechanics, the superposition of quantum states into which a photon(s) is placed has a probabilistic aspect. Thus, the quantum states of a photon do not have a specific associated location and time. Rather, the quantum states of a photon have a range of possibilities, referred to herein via their associated "probability amplitudes," which, in general, have non-zero values during the creation of the at least one qubit. When these probability amplitudes are associated with, for example, a linear polarization, the probability amplitudes can be represented by such notation as, $|H>$ and $|V>$.

In embodiments of the present invention, the probability amplitudes associated with the quantum states of the photon(s) are temporally separated. For example, as a photon (or multiphoton) is transmitted through a quantum computing device, the quantum states of the photon (or multiphoton) can be temporally separated by delaying one or more of the quantum states from the remaining quantum states. Consequently, the size of the quantum computing device scales at most linearly with the number of qubits required. In other words, by separating the quantum probability amplitudes temporally, rather than spatially, the scaling problems previously associated with optical simulations of quantum logic devices are avoided.

Figure 1:
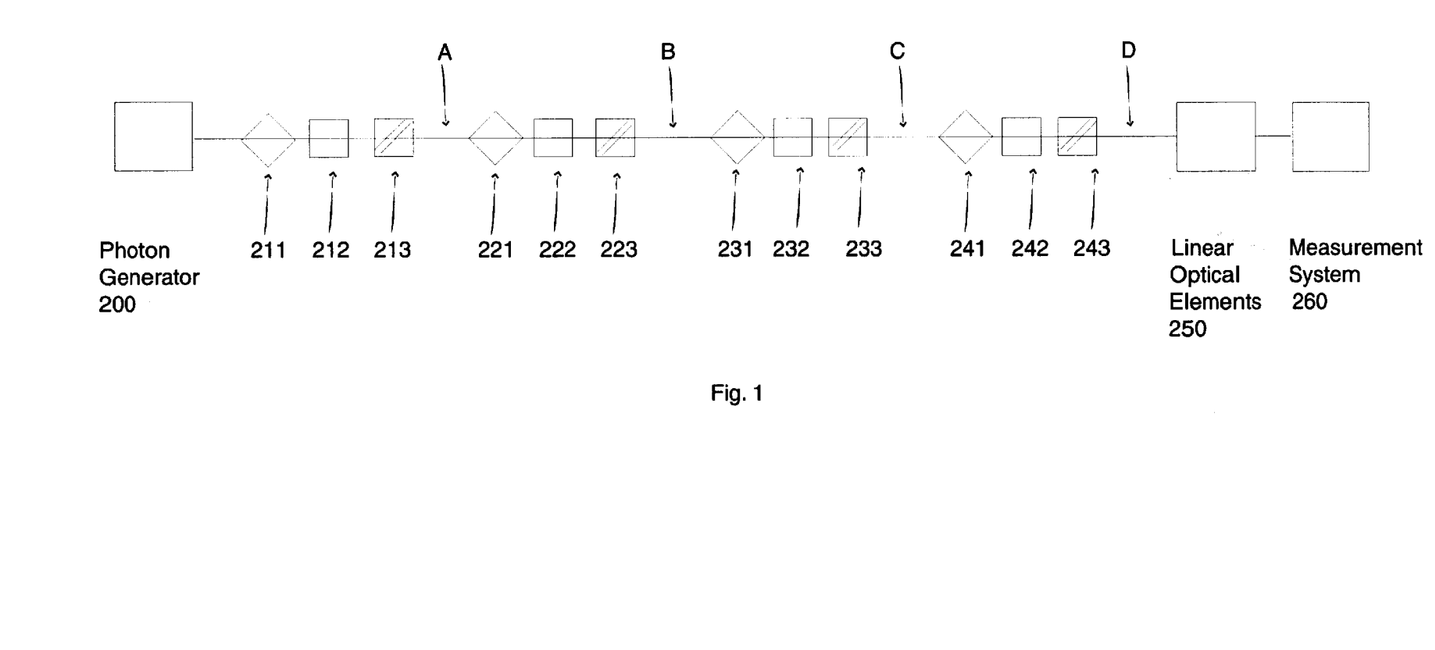
FIG. 1 shows a system block diagram of a quantum computing device, according to an embodiment of the present invention.

FIG. 1 shows a system block diagram of a quantum computing device, according to an embodiment of the present invention. FIG. 1 includes a photon generator 200, Hadamard transformers 211, 221, 231 and 241, phase shifters 212, 222, 232 and 242 and polarization rotators 213, 223, 233 and 243, linear optical elements 250 and measurement system 260.

Photon generator 200 can be any type of device which generates photons such as a laser, including either a continuous wave or pulsed laser. For example, photon generator 200 can be a Tsunami titanium sapphire laser made by Spectra-Physics pumped with a Millennia X-P solid state diode pumped laser (SSPL). Photon generator 200 can also include, for example, a second-harmonic generator (e.g., made by Spectra Physics). Photon generator 200 can also include a non-linear crystal such as a cut and optically polished, beta-barium borate (BBO) non-linear crystal, manufactured by for example Cleveland Crystals, Inc., or Inrad, Inc.

Hadamard transformers 211, 221, 231, and 241 can be any type of device that temporally separates the probability amplitudes associated with the quantum states for at least one photon produced by photon generator 200. The quantum states of the at least one photon are each associated with a mode from a group of orthogonal modes. For example, when the orthogonal modes are orthogonal polarizations (e.g., horizontal and vertical linear polarization, or clockwise and counter-clockwise circular polarization), the Hadamard transformers 211, 221, 231 and 241 can be any type of optical device that introduces a temporal separation or delay to the at least one photon based on the polarization. More specifically, such a Hadamard transformer can be for example a birefringent component that is made of, for example, a piece of crystal quartz manufactured from such optical parts manufacturers as CVI, Inc. or Optics for Research, Inc.

Polarization rotators 213, 223, 233 and 243 can be any type of appropriate polarization mode dispersion (PMD) device that rotates the polarization of the at least one photon produced by photon generator 200. The polarization rotators 213, 223, 233 and 243 can be for example Pockel cells driven by a computer controlled high voltage power supply. For example, the Pockel cells can be a model QC-10 by Quantum Technology, Inc. that is driven by a regulated high-voltage power supply such as the model HPV-5 by Quantum Technology, Inc.

Phase shifters 212, 222, 232 and 242 can be any type of device that introduces a timing-controlled variable phase shift. The phase shifters each can be, for example, switchable half-wave plate that can be inserted into the spatial path of the photon(s). Alternatively, the phase shifters can be Pockel cells that can be activated and deactivated over time; such Pockel cells can be similar to those described in reference to the polarization rotators. For example, the phase shifters, generally any type of optical element that can conditionally introduce transformations required to implement quantum logical operations, can be introduced in place of the polarization rotators.

Note that although FIG. 1 shows four sets of a Hadamard transformer, a phase shifter and a polarization rotator, any number of such sets are possible. As discussed below, each such set is associated with the creation and logical manipulation of each qubit. In other words, a set of a Hadamard transformer, a phase shifter and a polarization rotator can form the basis of a logic gate; a plurality of these logic gates can be connected (e.g., linearly or cyclically, as described below in reference to FIG. 5) to form a processor. Thus, additional sets of a Hadamard transformer, a phase shifter and a polarization rotator can be included or excluded from an embodiment so that the desired number of qubits are created and/or logically manipulated. Note also that the Hadamard transformer, a phase shifter and a polarization rotator can be arranged in various orders within the set. In addition, the phase shifter need not be included within the set, but rather can be included at any subsequent location along the spatial path of the photon(s) so that desired quantum logical operations can be implemented.

Linear optical elements 250 can be any type of appropriate set of optical elements that perform logic operations as are known in the quantum computing field. Linear optical elements 250 may include switchable mirrors or other elements similar to the phase shifters 212, 222, 232 and 242, and may not be necessary in some embodiments. The linear optical elements 250 can be any type of optical element, such as a half-wave plates, that can conditionally introduce transformations required to implement quantum logical operations.

Measurement system 260 can be any type of appropriate detection system capable of detecting at least a single photon. For example, measurement system 260 can include single-photon counting modules, a computer-controlled counter of single photon events and a coincidence measurement circuit. More specifically, the single-photon counting modules can be, for example, based on avalanche-photodiode technology, such as EG&G Inc. model SPCM AQ or based on photomultiplier-tube technology such as Hamamatsu, Inc. model H5920-01. The computer-controlled counter of single photon events can be, for example, the EG&G ORTEC model 974. The coincidence measurement circuit can be, for example, the EG&G ORTEC model 414A.

The overall operation of the optical computing device shown in FIG. 1 can be described by the following. Photon generator 200 can produce a single photon or multiple photons (i.e., multiphoton) which are then coupled into serial sets of Hadamard transformers, phase shifters and polarization rotators; for example, one such set can include Hadamard transformer 211, phase shifter 212 and polarization rotator 213. Quantum bits can then be created from a single photon (i.e., elementary quantum, electromagnetic field excitation) or multiphotons (i.e., a unit composed of a fixed number of entangled elementary field excitations) through the creation of pairs of quantum probability amplitudes. Each of these quantum probability amplitudes can be associated with an orthogonal quantum field mode. In the language of quantum logic, the creation of each such pair can be referred to as a Hadamard transform of the corresponding qubit.

More specifically, these probability amplitude pairs are created first by placing a photon (or multi-photon) in an occupation superposition of two modes. For example, a photon can be placed in an occupation superposition of two polarization modes by sending the photon into a polarization rotator (e.g., polarization rotator 213). As a result, the photon enters, for example, the polarization state, $|x>=(1/\sqrt{2})(|H>+|V>)$; in other words, the photon is placed in a superposition of quantum states each associated with a different polarization. Then, a binary division into two non-zero probability amplitudes of each qubit is made by temporally separating the two components of the quantum state of the polarization superposition. This can be accomplished, for example, by introducing a temporal delay between the occupation of these orthogonal modes of polarization.

Two polarization-state probability-density-maxima, one associated with the horizontal polarization, $|H>$, and one associated with the vertical polarization, $|V>$, simultaneously impinge on a polarization-mode-dispersive (PMD) optical element (e.g., Hadamard transformer 211) that introduces a relative time delay between the two polarization-state probability-density-maxima. In this way, a pair of time-separated polarization-associated non-zero quantum-probability-amplitudes representing one qubit is created. For example, when a linear-polarization-associated qubit, j, is created, an input photon in polarization state $|x>=(1/\sqrt{2})(|H>+|V>)$ encounters a polarization mode dispersive (PMD) device and the local maxima of probability density for the polarizations $|H>$ and $|V>$ emerge with a time separation of $\Delta t_j$. The two polarization qubit alternatives are then distinguishable by time of arrival of the photon or (multiphoton) at a given point in its path.

This process of qubit creation can be repeated as each photon (or multiphoton) moves along it spatial path. For example, as shown in FIG. 1, the process of qubit creation can be-performed for the set of devices 211, 212, and 213; again, the process of qubit creation is repeated for the set of devices 221, 222 and 223; again, repeated a third time for devices 231, 232 and 233; and finally, a fourth time for device 241, 242 and 243. The time delay between probability amplitudes for the two qubit alternatives of a qubit $q_j$ is $\Delta t_j$. Thus, a time separation exists between successive qubits j and j+1 as well as between the associated alternative qubit values {0} and {1}.

Figure 2:
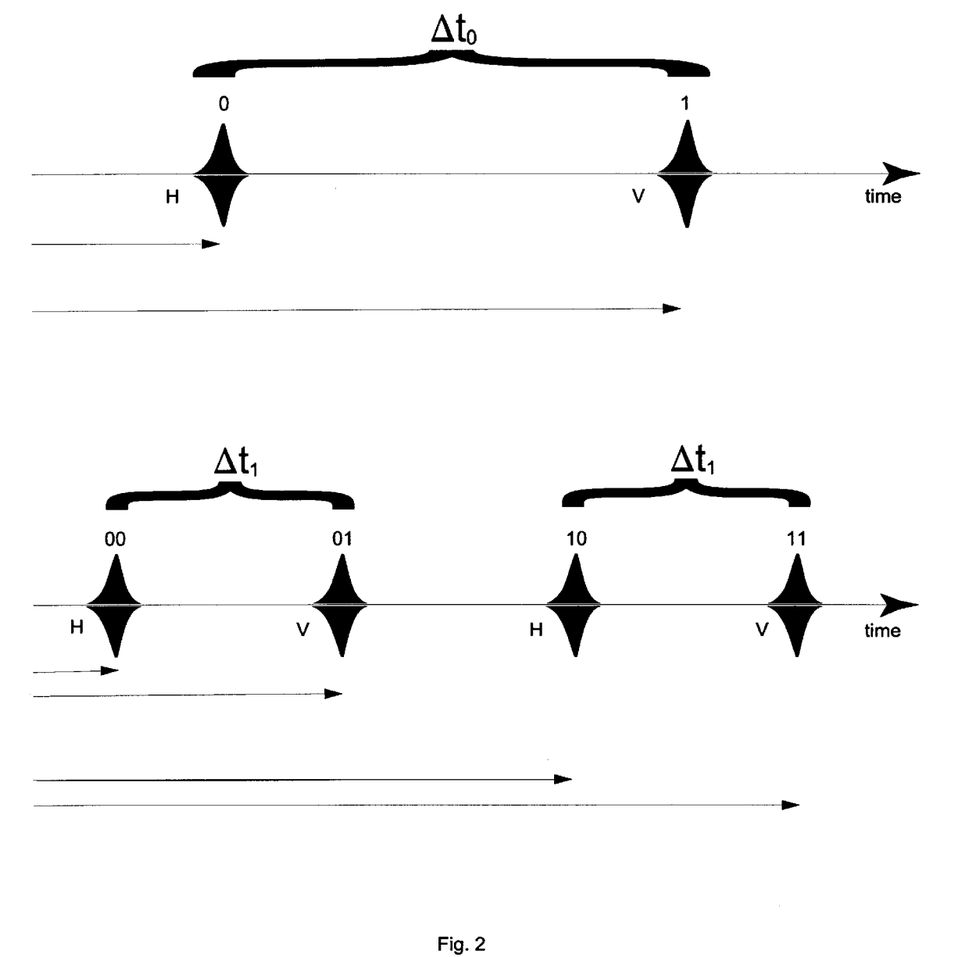
FIG. 2 illustrates an exemplary diagram of the time separation by which two qubits can be created, according to an embodiment of the present invention.

FIG. 2 illustrates an exemplary diagram of the time separation by which two qubits can be created, according to an embodiment of the present invention. The diagram of FIG. 2 represents an example of the relative time difference between probability amplitudes within a spatial path.

The top half of FIG. 2 shows the creation of a first qubit. This can correspond, for example, to location A within the spatial path shown in FIG. 1. As the top half of FIG. 2 illustrates, two probability amplitudes associated with a photon (or multi-photon) can be spatially separated in time where each probability amplitude is associated with a particular linear polarization. More specifically, the first probability amplitude (i.e., first in time) can have a associated vertical polarization; this probability amplitude can be associated with, for example, a qubit value of {1}. The second probability amplitude (i.e., second in time) can be associated with horizontal polarization; this probability amplitude can also be associated with a qubit alternative value of {0}. The two probability amplitudes are separated in time by $\Delta t_o$. Note that these two probability amplitudes can be within the same spatial paths at, for example, location A as shown in FIG. 1 although occurring at different points in time.

The lower half of FIG. 2 illustrates the creation of a second qubit. This can correspond to, for example, location B within the spatial path shown in FIG. 1. The first probability amplitude of the first qubit (labeled V and {1} in the top half of FIG. 2) is divided into two probability amplitudes, the first in time associated with the vertical polarization and the second in time associated with the horizontal polarization. These two probability amplitudes are separated by $\Delta t_1$. The first probability amplitude in time is associated with the two-qubit value {11} the second probability amplitude in time is associated with the two-qubit value {10}.

Similarly, the second probability amplitude in time shown in the top half of FIG. 2 is also split into two probability amplitudes. The first in time is associated with the vertical polarization and has a two-qubit value of {01}; the second in time is associated with the horizontal polarization and has a two-qubit value of {00}. Again these two probability amplitudes are separated by $\Delta t_1$.

Thus, the first qubit (shown in the top half of FIG. 2 and associated with location A on the spatial path shown in FIG. 1) results in the two qubits shown in the second half of FIG. 2 (which is associated with location B on FIG. 1). Whereas the one qubit shown in the top half of FIG. 2 has the alternative qubit values of {0} and {1}, the two qubit shown in the lower half of FIG. 2 has the associated alternative two-qubit values of {00}, {01}, {10}, {11}. This process can be repeated to create as many qubits as is required for the particular quantum computing application. Similarly, there will be an n-qubit string associated with the resulting probability amplitudes.

Figure 3:
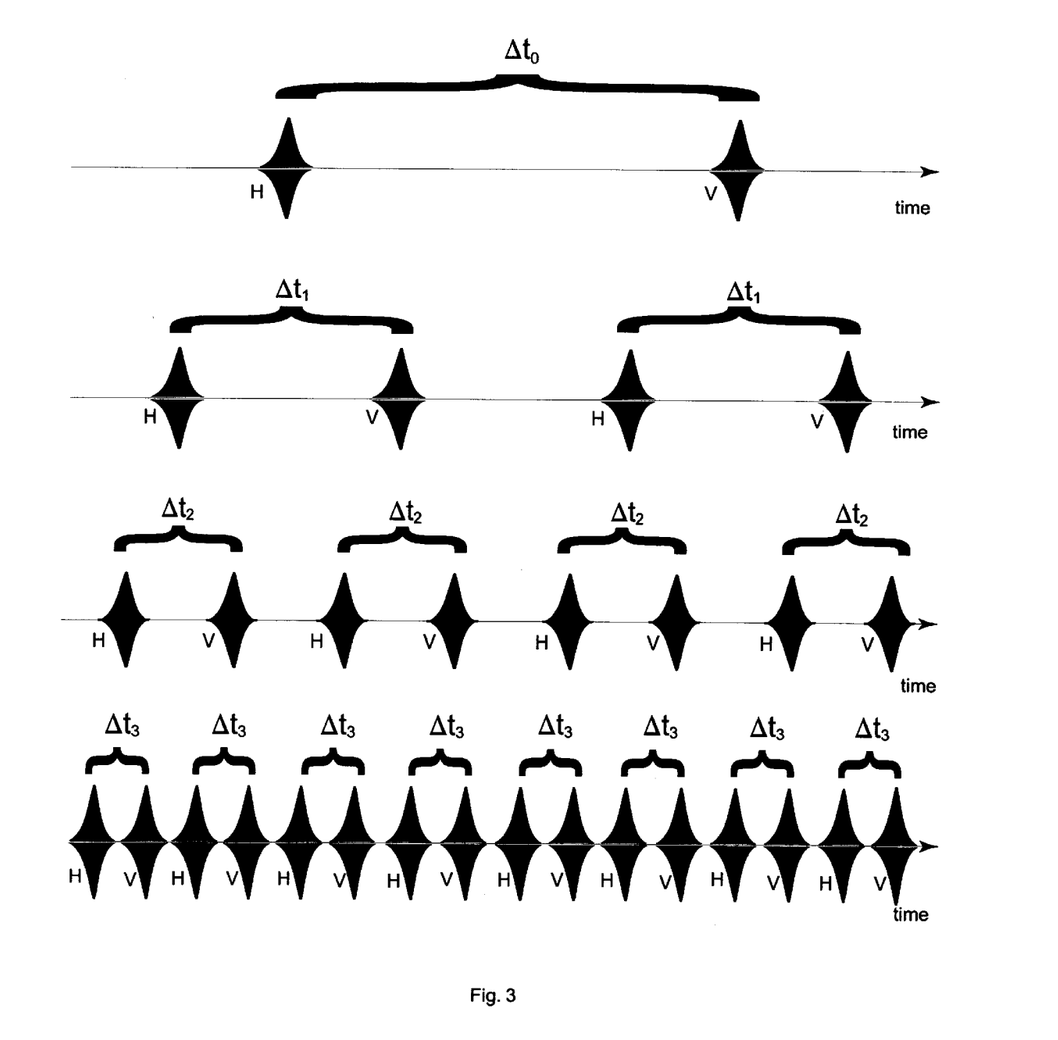
FIG. 3 illustrates an exemplary diagram of the time separation of the polarizations for the creation of four qubits, according to an embodiment of the present invention.
Figure 4:
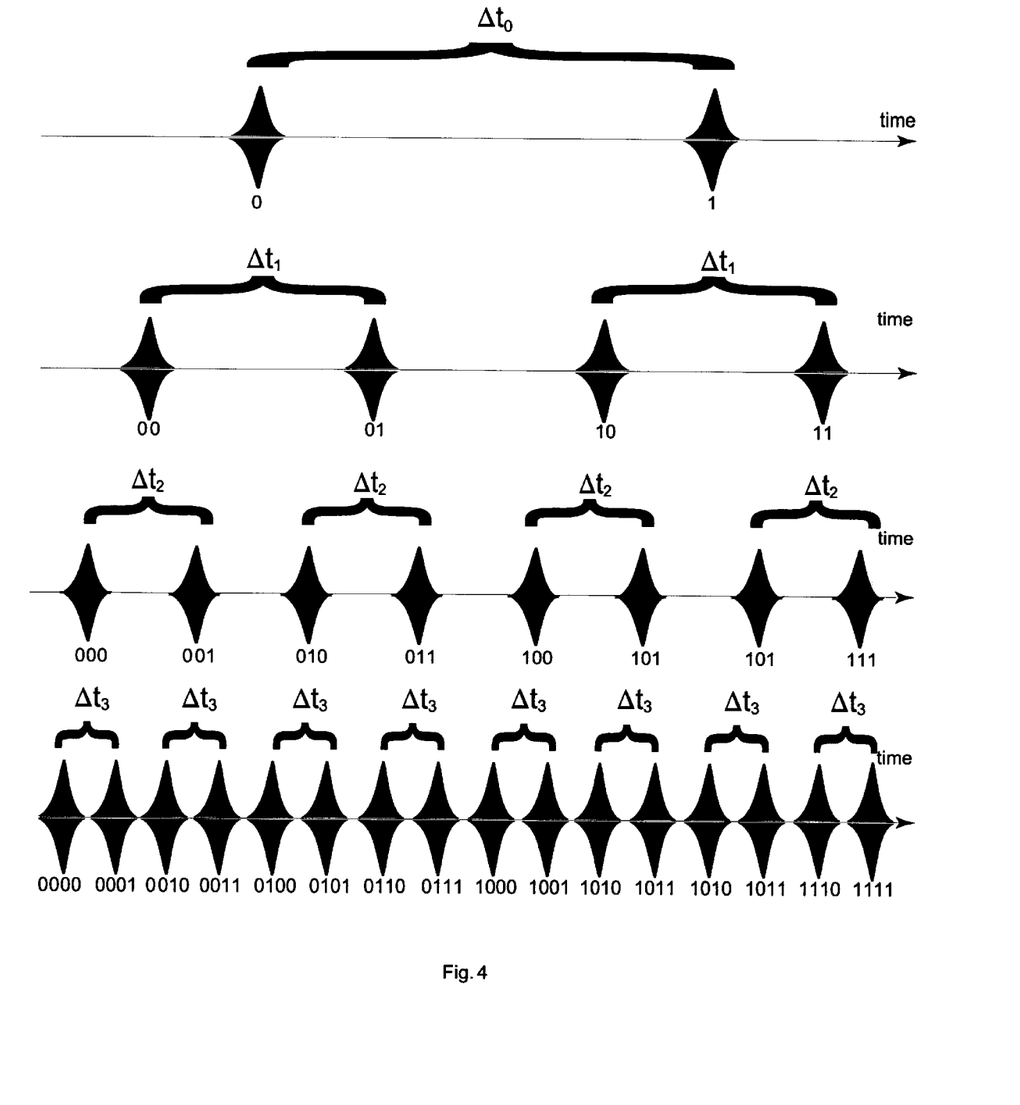
FIG. 4 illustrates an exemplary diagram of the time separation of the qubit values for the creation of four qubits, according to an embodiment of the present invention.

FIGS. 3 and 4 further illustrate this process. Both FIGS. 3 and 4 have four portions associated with locations A, B, C and D within the spatial path shown in FIG. 1: the top portion is associated with location A, the second portion is associated with location B, the third portion is associated with location C, and the bottom portion is associated with location D. As FIG. 3 shows, the first qubit is created by temporally separating two amplitude probabilities by a delay of $\Delta t_0$ where each probability amplitude has its own associated polarization. In other words, the first probability amplitude in time is associated with a vertical polarization and the second probability amplitude in time is associated with the horizontal polarization. As a second qubit is created, the two probability amplitudes associated with location A are divided to produce four probability amplitudes associated with location B. The first pair of probability amplitudes are separated by $\Delta t_1$ and have alternating polarization associations. The second pair of amplitude polarizations are separated by $\Delta t_1$ and again have their own polarization associations.

A third qubit is created by dividing the four probability amplitudes associated with the two qubit into eight probability amplitudes that are composed of four probability amplitude pairs. These eight amplitude probabilities are associated with location C on the spatial path shown in FIG. 1. Each probability amplitude pair is separated by a time delay $\Delta t_2$ and each have a alternating polarization association.

Finally, the bottom portion of FIG. 3 shows the sixteen amplitude probabilities associated with four qubits and associated with location D on the spatial path shown on FIG. 1.

FIG. 4 shows the amplitude probabilities corresponding to those shown in FIG. 3 with their associated qubit values. For example, the amplitude probabilities shown in top portion of FIG. 4 that correspond to location A on the spacial path shown on FIG. 1 have a value of {0} and {1}. The second portion shown in FIG. 4 shows the amplitude probabilities associated with location B on the spacial path shown on FIG. 1 where the two-qubit values are {00}, {01}, {10}, {11}. The third portion of FIG. 4 shows the three-qubit values from {000} to {111}. Finally, the fourth portion of FIG. 4 shows the four-qubit values ranging from {0000} to {1111}.

The computational result of the quantum computing device can be determined based on the time of arrival of the input photon (or multiphoton) at the measurement system 260. Said another way, the computational result is determined by the detection of a photon(s) at one of its possible locations in the distribution of amplitudes (e.g., as shown in the bottom portion of FIG. 3) at a given time after the photon has been output. The given time of arrival at the measurement system 260 corresponds to a given multiple-qubit quantum state.

In an alternative embodiment, the linear optical elements 250 can deflect the path of the probability amplitudes associated with the photon(s) into a corresponding array of detectors. For example, the linear optical elements 250 can include an array of switchable mirrors. Such a linear array of mirrors can also be used to obtain a broad range of quantum states for use in further information processing by selecting a subset of probability amplitudes by switching into the photon path a subset of the mirrors of such an array.

In general, the times of arrival (or linear spatial distribution) corresponding to the output qubit values can be precisely determined once the input time of a given input photon(s) produced by the photon generator 200 is known. The time of input can be determined, for example, by using a signal photon of a two photon pair created in parametric down-conversion as the input photon and by using the detection of the corresponding idler photon of this pair as a time marker. Such an arrangement is effective because the photon pair are time correlated through their simultaneous creation in the process of parametric down-conversion. The time of creation of the photon pair (and thus the input signal photon) can then be determined from the known time-of-flight of the idler photon from the down-conversion crystal to the idler detector. Once the time of creation of the photon pair is thus determined, the input time of the input signal photon is determined. Consequently, the times of arrival corresponding to the output qubit values can be precisely determined.

Figure 5:
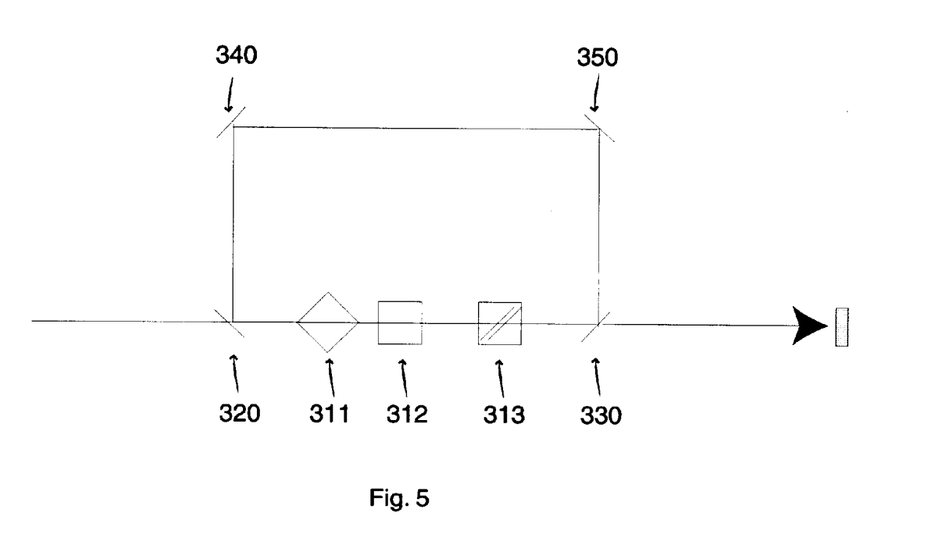
FIG. 5 illustrates a cyclical arrangement of the time-delay quantum computation architecture, according to another embodiment of the present invention.

FIG. 5 illustrates a cyclical arrangement of the time-delay quantum computation architecture, according to another embodiment of the present invention. As shown in FIG. 5, the Hadamard transformer 311, phase shifter 312 and polarization rotator 313 are operatively associated with switchable mirrors 320, 330, 340 and 350. As a photon(s) is first transmitted through Hadamard transformer 311, phase shifter 312 and polarization rotator 313, mirrors 320 and 330 can be switched into the spatial path of the photon(s) so that the photon(s) is redirected to mirror 350, then mirror 340 back to mirror 320. Consequently, the photon(s) can be repeatedly passed through the Hadamard transformer 311, phase shifter 312 and polarization rotator 313 thereby creating another qubit for the photon(s). Mirror 330 can be switched out once the sufficient number of qubits have been created and/or logically manipulated.

The cyclical arrangement shown in FIG. 5 can be substituted with the corresponding components shown in FIG. 1 that is, those elements between the photon generator 200 and linear optical elements 250 shown in FIG. 1. In other words, each set of a Hadamard transformer, phase shifter and polarization rotator (e.g., Hadamard transformer 211, phase shifter 212, and polarization rotator 213) can be replaced by a pass through the cyclical configuration shown in FIG. 5. Each pass through the cyclical configuration of FIG. 5 is equivalent to a set of a Hadamard transformer, phase shifter and polarization rotator shown in FIG. 1.

It should, of course, be understood that while the present invention has been described in reference to particular configurations, other configurations should be apparent to those of ordinary skill in the art. For example, although the embodiments discussed above generally refer to performing quantum logical operations based on the polarizations of the amplitude probabilities, quantum logical operations can be performed through optical transformations in other quantum domains in which quantum entanglement can be engendered between field modes, such as momentum, position and energy.

What is claimed is:

1. A method for creating at least one qubit in a quantum computing device, comprising:

placing at least one photon into a superposition of quantum states, the quantum states each having an associated probability amplitude, the quantum states each being associated with a mode from a group of orthogonal modes; and temporally separating the probability amplitudes associated with the quantum states of the at least one photon.

2. The method of claim 1, wherein:

the probability amplitudes associated with the quantum states of the at least one photon are temporally separated along a single spatial path.

3. The method of claim 1, wherein:

a number of the at least one photon is fixed while being placed into a superposition of quantum states and while having its associated probability amplitudes temporally separated.

4. The method of claim 1, wherein:

each probability amplitude being associated with a qubit alternative.

5. The method of claim 1, wherein:
the temporally-separated plurality of probability amplitudes being associated with at least one qubit.

6. The method of claim 1, wherein:
the mode associated with each quantum state of the at least one photon is a polarization characteristic, the group of orthogonal modes being one from the set of orthogonal linear polarizations and orthogonal circular polarizations.

7. The method of claim 1, wherein:
the probability amplitudes of the at least one photon are temporally separated corresponding to a Hadamard transformation on the at least one photon.

8. The method of claim 1, wherein:
the probability amplitudes of the at least one photon are temporally separated n times to produce n qubits, the probability amplitudes each being associated with an n-qubit string.

9. The method of claim 1, wherein:
the probability amplitudes of the at least one photon are temporally separated n times to produce n qubits, the probability amplitudes each being associated with a qubit alternative; and
the alternatives of the $i^{th}$ qubit being temporally separated by an $i^{th}$ delay, $\Delta t_i$.

10. A method for creating at least one qubit in a quantum computing device, comprising:
placing a photon into a superposition of quantum states, the quantum states each having an associated probability amplitude, the quantum states each being associated with a mode from a group of orthogonal modes; and
temporally separating the probability amplitudes associated with the quantum states of the at least one photon;
performing at least one conditional phase shift on the at least one photon, the at least one conditional phase shift performing at least one quantum-logic operation on the temporally-separated plurality of probability amplitudes; and
measuring the quantum states of the at least one photon at at least one from the group of a plurality of times and a plurality of locations, the measured quantum states being associated with an output of the quantum computing device.

11. A method for creating at least one qubit in a quantum computing device, comprising:
producing at least one photon, the at least one photon having a plurality of probability amplitudes; and
time-separating the plurality of probability amplitudes of the at least one photon, the time-separated plurality of probability amplitudes being associated with at least one qubit.

12. The method of claim 11, wherein:
the plurality of probability amplitudes of the at least one photon are time-separated along a single spatial path.

13. The method of claim 11, wherein:
a number of the at least one photon is fixed while being placed into a superposition of quantum states and while having its associated probability amplitudes temporally separated.

14. The method of claim 11, wherein:
the plurality of probability amplitudes of the at least one photon are each associated with quantum states, each probability amplitude of the plurality of probability amplitudes being associated with an n-qubit string.

15. An apparatus, comprising:
a polarization mode dispersion (PMD) device, said PMD device receiving at least one photon being in a superposition of quantum states, the quantum states each having an associated probability amplitude, said PMD device performing a Hadamard transformation on the at least one photon; and
an optical device operatively coupled to said PMD device along a single spatial path, said optical device performing a conditional phase shift on the at least one photon,
the probability amplitudes associated with the quantum states of the at least one photon being temporally separated along the single spatial path after the PMD device and the optical device.

16. The apparatus of claim 15, further comprising:
a photon generator operatively coupled to said PMD device along the single spatial path, said photon generator producing the at least one photon.

17. The apparatus of claim 15, wherein:
a number of the at least one photon received at said PMD device and received by said optical device is fixed.

18. The apparatus of claim 15, further comprising:
a photon generator operatively coupled to said PMD device along the single spatial path, said photon generator producing the at least one photon through parametric down-conversion.

19. The apparatus of claim 15, further comprising:
a photon generator operatively coupled to said PMD device along the single spatial path, said photon generator producing the at least one photon;
a first optical-path selector, said first optical-path selector being operatively coupled to and disposed between said photon generator and said PMD device along the single spatial path; and
a second optical-path selector, said second optical-path selector being operatively coupled to said optical device, said optical device being disposed between said PMD device and said second optical-path selector along the single spatial path.

20. The apparatus of claim 19, wherein:
said first optical-path selector and said second optical-path selector define the single spatial path to include said PMD device and said optical device multiple times.

21. The apparatus of claim 19, wherein:
said first optical-path selector is a first switchable mirror, and
said second optical-path selector is a second switchable mirror, said first optical-path selector and said second optical-path selector being configured to be switchable in coordination.

22. The apparatus of claim 15, further comprising:
a plurality of linear optical elements, said plurality of linear optical elements being operatively coupled to said optical device along the single spatial path, said plurality of linear optical elements performing quantum-logical operations on the at least one photon.

23. The apparatus of claim 15, further comprising:
a plurality of linear optical elements operatively coupled to said optical device along the single spatial path, said plurality of linear optical elements performing quantum-logical operations on the at least one photon; and
a measurement system operatively coupled to said plurality of linear optical elements along the single spatial path, said measurement system measuring the quantum states of the at least one photon at at least one from the group of a plurality of times and a plurality of locations, the measured quantum states being associated with an output of the quantum computing device.

24. A processor, comprising:

a plurality of interconnected logic gates, at least one logic gate having:

a polarization mode dispersion (PMD) device, said PMD device receiving at least one photon being in a superposition of quantum states, the quantum states each having an associated probability amplitude, said PMD device performing a Hadamard transformation on the at least one photon; and an optical device operatively coupled to said PMD device along a single spatial path, said optical device performing a conditional phase shift on the at least one photon, the probability amplitudes associated with the quantum states of the at least one photon being temporally separated along the single spatial path after the PMD device and the optical device.

25. A method for creating a plurality of qubits in a quantum computing device, comprising:

placing a photon into a superposition of quantum states, the quantum states each having an associated probability amplitude;

temporally separating the probability amplitudes associated with the quantum states of the at least one photon a number of times corresponding to a desired number of qubits to be created.

26. The method according to claim 25, wherein the probability amplitudes are temporally separated using a Hadamard transformation.

27. An apparatus for creating at least one qubit comprising:

(a) a photon generator;

(b) a quantum state generation device, wherein the quantum state generation device produces at least one photon in a superposition of states;

(c) a temporal separation device, wherein the temporal separation device separates the probability amplitudes associated with each state in the superposition of states.

28. The apparatus according to claim 27, wherein the quantum state generation device is a polarization rotator.

29. The apparatus according to claim 27, wherein the temporal separation device is a Hadamard transformer.

* * * * *